UNITED STATES PATENT OFFICE.

MAURICE J. O'DONNELL, OF FALL RIVER, MASSACHUSETTS.

COMPOUND FOR PRESERVING BELTS.

SPECIFICATION forming part of Letters Patent No. 611,459, dated September 27, 1898.

Application filed January 25, 1898. Serial No. 667,877. (No specimens.)

*To all whom it may concern:*

Be it known that I, MAURICE J. O'DONNELL, of Fall River, in the county of Bristol and State of Massachusetts, have invented certain new and useful Improvements in Compounds for Preserving Belts; and I do hereby declare that the following is a full, clear, and exact description thereof.

This invention relates to that class of compounds made to be applied to belts of leather or like material used in operating machinery, the object being to keep the belt pliant and from becoming dry and liable to crack in bending repeatedly around the pulleys while under great strain. When dry a belt is much more liable to slip and fail to convey the power and to be worn away by the friction of the pulley-surface.

To make the compound, I take one-quarter of a pint of cod-liver oil, one-quarter of a pound of flour, preferably wheat, one-half of a pound of tallow, and one-quarter of a pound of soot and mix them together thoroughly. These proportions give the best results, but may be varied slightly, according to circumstances—as, for instance, if the belt is to be used in a place exposed to much heat I would increase the quantity of tallow used a little, and if the belt is to be exposed to the cold I would increase the quantity of the cod-liver oil used. This composition I apply to the side of the belt that comes in contact with the pulley, and from the nature of the ingredients it gives to the belt an excellent holding capacity on the face of the pulley. At the same time it receives from the antiseptic nature of the soot great preserving qualities both for the belt and for the compound itself.

Having thus described my improved compound, I claim as my invention and desire to secure by Letters Patent—

The herein-described compound for dressing and preserving belts for machinery, consisting of the following ingredients: cod-liver oil, flour, tallow, and soot, in the proportions, substantially as described.

In testimony whereof I have hereunto set my hand.

MAURICE J. O'DONNELL.

In presence of—
THOMAS F. O'DONNELL,
BENJ. ARNOLD.